(12) United States Patent
Mikami et al.

(10) Patent No.: US 8,905,642 B2
(45) Date of Patent: Dec. 9, 2014

(54) ROLLING BEARING

(75) Inventors: Hidenobu Mikami, Mie (JP); Yosuke Taguchi, Mie (JP)

(73) Assignee: NTN Corporation, Osaka (JP)

( * ) Notice: Subject to any disclaimer, the term of this patent is extended or adjusted under 35 U.S.C. 154(b) by 229 days.

(21) Appl. No.: 13/138,343

(22) PCT Filed: Feb. 24, 2010

(86) PCT No.: PCT/JP2010/052830
§ 371 (c)(1),
(2), (4) Date: Aug. 30, 2011

(87) PCT Pub. No.: WO2010/098342
PCT Pub. Date: Sep. 2, 2010

(65) Prior Publication Data
US 2011/0311173 A1  Dec. 22, 2011

(30) Foreign Application Priority Data

Feb. 27, 2009 (JP) ................... 2009-045733
Nov. 24, 2009 (JP) ................... 2009-266445
Nov. 27, 2009 (JP) ................... 2009-270639

(51) Int. Cl.
*F16C 19/04* (2006.01)
*F16C 33/12* (2006.01)
(Continued)

(52) U.S. Cl.
CPC .............. *C23C 22/02* (2013.01); *C10M 105/24* (2013.01); *C10M 2207/2895* (2013.01);
(Continued)

(58) Field of Classification Search
USPC ......... 384/492, 572, 596, 614, 625, 912, 490, 384/491, 513, 423, 609; 508/291; 525/227
See application file for complete search history.

(56) References Cited

U.S. PATENT DOCUMENTS 7,427,162 B2 * 9/2008 Kano et al. .................... 384/492
2004/0131580 A1 * 7/2004 Hagino et al. .................. 424/74

FOREIGN PATENT DOCUMENTS

DE  4042157 A1 * 7/1992 ............... A23K 1/16
EP  1764406 A1 * 3/2007 ........... C10M 169/04
(Continued)

*Primary Examiner* — Marcus Charles
(74) *Attorney, Agent, or Firm* — Hedman & Costigan, P.C.; James V. Costigan; Kathleen A. Costigan

(57) ABSTRACT

A rolling bearing which has excellent performance at high-temperatures and has high-speed durability and quietness, is capable of effectively preventing hydrogen brittleness-caused peeling from occurring on a rolling surface thereof, and has a low environmental load. The rolling bearing (1) is constructed of an inner ring (2) having a rolling surface on its peripheral surface, an outer ring (3) having a rolling surface on its inner peripheral surface, a plurality of rolling elements (4) disposed between both rolling surfaces, and a cage (5) retaining the rolling elements (4). The inner ring (2), the outer ring (3), the rolling elements (4) or the cage (5) are metal-made bearing members. Film-coating treatment is conducted on a sliding surface or a rolling surface of at least one of these metallic bearing members with plant-derived polyvalent alcohol compounds such as curcumin, quercetin, chlorogenic acid or the like.

8 Claims, 7 Drawing Sheets

(51) Int. Cl.

| | | |
|---|---|---|
| *F16C 33/32* | (2006.01) |
| *C10M 105/24* | (2006.01) |
| *C23C 22/02* | (2006.01) |
| *C10M 177/00* | (2006.01) |
| *C10M 105/14* | (2006.01) |
| *F16C 33/44* | (2006.01) |
| *F16C 33/62* | (2006.01) |
| *F16C 33/66* | (2006.01) |
| *C10M 105/08* | (2006.01) |
| *C10M 105/20* | (2006.01) |
| *C10M 105/28* | (2006.01) |
| *C10M 105/32* | (2006.01) |
| *C23C 22/05* | (2006.01) |
| *C10M 105/40* | (2006.01) |

(52) U.S. Cl.
CPC ............ *C10M 177/00* (2013.01); *C10M 105/14* (2013.01); *C10N 2250/14* (2013.01); *C10M 2207/085* (2013.01); *C10N 2230/06* (2013.01); *C10M 2207/289* (2013.01); *C10M 2207/025* (2013.01); *C10M 2207/1443* (2013.01); *C10N 2230/08* (2013.01); *C10M 2207/024* (2013.01); *C10N 2270/00* (2013.01); *F16C 33/445* (2013.01); *F16C 33/62* (2013.01); *F16C 33/6633* (2013.01); *F16C 33/44* (2013.01); *C10M 2207/124* (2013.01); *F16C 33/32* (2013.01); *C10M 2207/125* (2013.01); *C10M 2207/1213* (2013.01); *C10M 105/08* (2013.01); *C10M 2207/144* (2013.01); *C10M 2207/128* (2013.01); *C10N 2240/20* (2013.01); *C10M 2207/1253* (2013.01); *C10M 2207/08* (2013.01); *C10N 2240/02* (2013.01); *C10M 105/20* (2013.01); *C10M 105/28* (2013.01); *C01M 105/16* (2013.01); *C10M 2207/2805* (2013.01); *C10M 105/32* (2013.01); *C10N 2280/00* (2013.01); *C23C 22/05* (2013.01); *C10M 105/40* (2013.01)
USPC ............ 384/490; 384/523; 384/609; 384/625

(56) References Cited

FOREIGN PATENT DOCUMENTS

| | | | | |
|---|---|---|---|---|
| JP | 02-256920 | | 10/1990 | |
| JP | 03-210394 | | 9/1991 | |
| JP | 04021601 A | * | 1/1992 | ............... A01N 3/00 |
| JP | 05146496 A | * | 6/1993 | ............... A61L 9/01 |
| JP | 09-208982 | | 8/1997 | |
| JP | 11-030236 | | 2/1999 | |
| JP | 11-270566 | | 10/1999 | |
| JP | 2000-136325 | | 5/2000 | |
| JP | 2001-098392 | | 4/2001 | |
| JP | 2001-107073 | | 4/2001 | |
| JP | 2001098392 A | * | 4/2001 | ............. C23F 11/00 |
| JP | 2004051912 A | * | 2/2004 | ........... C10M 169/02 |
| JP | 2005-42102 | | 2/2005 | |
| JP | 2007-039776 | | 2/2007 | |
| JP | 2007039776 A | * | 2/2007 | |
| JP | 2008-057602 | | 3/2008 | |
| JP | 2008057602 A | * | 3/2008 | |
| JP | 2010271469 A | * | 12/2010 | |
| WO | WO 2004045581 A1 | * | 4/2004 | ............. A61K 31/70 |
| WO | WO 2007009446 A2 | * | 1/2007 | |

* cited by examiner (a)　　　(b)

ROLLING BEARING

CROSS-REFERENCE TO RELATED APPLICATIONS

The present application is a Section 371 application of PCT/JP2010/052830.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF THE INVENTION

1. Field of the Invention

The present invention relates to a rolling bearing and particularly a rolling bearing of home electric appliances, industrial equipment, and the like used in a high-temperature and high-speed rotation. More particularly the present invention relates to a rolling bearing for a motor supporting a rotor thereof and a rolling bearing for electric parts and auxiliary machines of a car such as an alternator, an electromagnetic clutch for a car air conditioner, a fan coupling apparatus, an intermediate pulley, and an electromotive fan motor.

2. Description of Related Art Including Information Disclosed Under 37 CFR§§1.97 and 1.98

The lubricating composition is packed inside rolling bearings to be incorporated in various industrial machines and vehicles to impart lubricity thereto. The lubricating composition is obtained by kneading base oil and a thickener, and an additive as necessary. As the base oil, synthetic lubricating oil such as mineral oil, ester oil, silicone oil, and ether oil is generally used. As the thickener, a metal soap such as lithium soap and urea-based compounds are generally used. As the additive, an antioxidant, a rust proof agent, a metal deactivator, a viscosity index improver, and the like are used as necessary. As the antioxidant, organic zinc compounds such as zinc alkyldithiophosphate and amine compounds such as alkylated diphenylamine are used singly or in combination.

In recent years, rolling bearings for use in home electric appliances and industrial equipment are used in a high-temperature and high-speed rotation and demanded to be excellent in quietness and durability at high temperatures and high speeds. As a lubricating composition such as grease which is excellent in the high-temperature durability, restrains abnormal noise when it is cold, and is excellent in a peeling resistance property at a high temperature and under a high load, a lubricating composition composed of base oil consisting of synthetic hydrocarbon oil and ester oil and a urea-based thickener added to the base oil is known (see patent documents 1 and 2).

As a lubricating composition having a long life until before seizing occurs in a high-temperature and high-speed rotation condition, a composition containing ester oil as its base oil and 3 to 30 wt % of a thickener essentially containing an aliphatic diurea compound (see patent document 3) is known.

A sliding member or a rolling member having a chemical reaction film layer of a compound having a thickness of 0.05 to 0.5 µm formed on the surface thereof by a chemical bond reaction of at least one kind selected from among an organic phosphorus compound, an organic sulfur compound, an organic chlorine compound, and an organic metal compound is known (see patent document 4). A metal material for a bearing having a film of a metal salt of a thiophosphorus acid formed on the surface thereof is also known (see patent document 5).

In recent years, there is a tendency for motors to be made smaller. A bearing supporting the rotor of a motor tends to be operated at a higher speed and under a higher surface pressure. Motors for home electric appliances and equipment for cars are required to be quiet. Motors for industrial machines are required to have high-temperature durability in addition to quietness. Conventionally the grease compositions as described in the patent documents 1 and 2 are mainly used to lubricate rolling bearings for these motors.

Because use conditions such as a high-speed rotation, a high surface pressure have become strict owing to the growing demands for downsizing and high performance, there arises a problem that a peculiar peeling phenomenon occurs with the rolling surface of the bearing turning into white in its texture. Unlike peeling which occurs inside the rolling surface owing to metal fatigue, the peculiar peeling phenomenon is a destructive phenomenon which occurs from the rolling surface at a comparatively shallow portion thereof with the rolling surface turning into white in its texture and is considered a hydrogen brittleness caused by hydrogen generated by the decomposition of grease.

As a method of preventing the peculiar peeling phenomenon which occurs in an early stage with the rolling surface turning into white in its texture, the method of adding the passivating agent to the grease composition (see patent document 6) and the method of adding the bismuth dithiocarbamate thereto are known (see patent document 7).

Owing to a recent growing demand for downsizing of vehicles, weight saving thereof, and the improvement of quietness, attempts are being made to manufacture smaller and more lightweight electric parts and auxiliary parts of a car and make the engine room airtight. On the other hand, there is a growing demand for a high output and a high efficiency for the performance of various apparatuses of the car. Thus the present tendency is to compensate the miniaturization-caused reduction of the output of the electric auxiliary machines of the car provided inside the engine room by rotating them at high speeds. As examples of rolling bearings for use in the electric auxiliary machines of the car, the outline of each of a rolling bearing for a fan coupling apparatus, a rolling bearing for an alternator, a rolling bearing for an idler pulley is described below.

In the fan coupling apparatus, a viscous fluid is sealed inside it. A housing having an air-feeding fan mounted on its peripheral surface is coupled to a rotor directly connected to the engine through a bearing. By utilizing the shear resistance of the viscous fluid which increases and decreases in response to an atmospheric temperature, the amount of a driving torque transmitted from the engine and the number of rotations of the fan are controlled. Thereby the fan coupling apparatus feeds optimum air corresponding to the temperature of the engine. Therefore the rolling bearing for use in the fan-coupling apparatus is demanded to have a high heat resistance, grease-sealing performance, and durability so that the rolling bearing withstands a high rotational speed change in the range from 1000 rpm to 10000 rpm in dependence on a fluctuation of the temperature of the engine and in addition withstands very strict environment in which it is driven in summer at a high speed not less than 10000 rpm at a high temperature not less than 180° C.

The alternator for use in a car receives the rotation of an engine and generates electricity, thus supplying an electric power to an electric load of the car and has a function of charging a battery. Therefore the rolling bearing for use in the alternator is demanded to have a high heat resistance, grease-sealing performance, and durability so that the rolling bearing withstands a very strict environment in which it is rotated at a high speed not less than 10000 rpm at a high temperature not less than 180° C.

The idler pulley of the car is used as a belt tensioner for the driving belt transmitting the rotation of the engine to electric auxiliary machines thereof. The idler pulley has the function of a pulley for imparting a tensile force to the driving belt when the distance between rotating shafts is fixed. The idler pulley has another function of an idler used to change the travel direction of the belt or avoiding interference of obstacles to reduce the volume inside the engine chamber. Therefore the rolling bearing for use in the idle pulley is demanded to have a high heat resistance, grease-sealing performance, and durability so that the rolling bearing withstands a very strict environment in which it is rotated at a high speed not less than 10000 rpm at a high temperature not less than 180° C.

A grease composition is mainly used to lubricate the rolling bearings for use in electric parts and auxiliary machines of the car. Because the use conditions such as a sudden acceleration/deceleration, high-temperature rotation, a high-speed rotation, and the like have become strict, similarly to the rolling bearing for the motor, there arises a problem that the peculiar peeling phenomenon occurs with the rolling surface of the bearing turning into white in its texture. In the rolling bearings, as a method of preventing the peculiar peeling phenomenon which occurs in an early stage with the rolling surface thereof turning into white in its texture, the method of adding the passivating agent to the grease composition (see patent document 6) and the method of adding the bismuth dithiocarbamate thereto are known (see patent document 7) as in the case of the rolling bearing for the motor.

PRIOR ART DOCUMENT

Patent Document

Patent document 1: Japanese Patent Application Laid-Open No. H09-208982
Patent document 2: Japanese Patent Application Laid-Open No. H11-270566
Patent document 3: Japanese Patent Application Laid-Open No. 2001-107073
Patent document 4: Japanese Patent Application Laid-Open No. H02-256920
Patent document 5: Japanese Patent Application Laid-Open No. H11-030236
Patent document 6: Japanese Patent Application Laid-Open No. H03-210394
Patent document 7: Japanese Patent Application Laid-Open No. 2005-42102

DISCLOSURE OF THE INVENTION

Problem to be Solved by the Invention

But even the lubricating (grease) composition and the lubricating composition containing additives such as the antioxidant as described in the patent documents 1 through 3 are not necessarily capable of satisfying the performance of high-temperature and high-speed durability when these lubricating composition are packed inside the bearing for recent home electric appliances and industrial equipment operated in a high-temperature and high-speed rotation.

The lubricating compositions described in the patent documents 4 and 5 are intended to improve the wear resistance and are not sufficient for preventing the occurrence of seizing in the high-temperature and high-speed rotation. Further in disposing used rolling bearings as industrial wastes, it is desired not to use the organic phosphorous compound to avoid adverse influence on biological environment.

In recent motors for industrial machines, high-speed operation—sudden deceleration operation—sudden acceleration operation—sudden stop (sudden acceleration and deceleration) is frequently performed. Thus the use condition of the rolling bearing supporting the rotor of the motor has become increasingly strict. Therefore the method of adding the passivating agent to the grease described in the patent document 6 and the method of adding the bismuth dithiocarbamate thereto described in the patent document 7 are insufficient as measures for preventing the occurrence of the peeling phenomenon. In addition, the method of adding the passivating agent to the grease described in the patent document 6 and the method of adding the bismuth dithiocarbamate to the grease described in the patent document 7 are inferior for keeping the rolling bearing quiet when the motor rotates because in these methods, solid fine powder is used.

Because the use condition of the rolling bearing for recent electric parts and auxiliary machines of a car has become increasingly strict, the method of adding the passivating agent to the grease described in the patent document 6 and the method of adding the bismuth dithiocarbamate to the grease described in the patent document 7 are insufficient for preventing the rolling bearing from having the peeling phenomenon.

The present invention has been made to solve the above-described problems. That is, it is an object of the present invention to provide a rolling bearing which has a low environmental load and is excellent in high-temperatures and high-speed durability. It is another object of the present invention to provide a rolling bearing which is capable of effectively preventing hydrogen brittleness-caused peeling from occurring on a rolling surface thereof, can be used for a long time, and is excellent in quietness.

BRIEF SUMMARY OF THE INVENTION

The rolling bearing of the present invention has metal-made bearing members including an inner ring, an outer ring, a plurality of rolling elements disposed between the inner ring and the outer ring, and a cage retaining the rolling elements. Film-coating treatment is conducted on a sliding surface or a rolling surface of at least one of the metal-made bearing members with plant-derived polyvalent alcohol compounds.

The member on which the film-forming treatment is conducted has an iron oxide film on a sliding surface or a rolling surface thereof. The metal-made bearing member on which the film-forming treatment is to be conducted is immersed in a treatment liquid in which the plant-derived polyvalent alcohol compounds are dispersed or dissolved in water and/or an organic solvent.

The plant-derived polyvalent alcohol compounds is curcumin or derivatives thereof. The plant-derived polyvalent alcohol compounds is quercetin or derivatives thereof.

The plant-derived polyvalent alcohol compounds is chlorogenic acid or derivatives thereof. The plant-derived polyvalent alcohol compounds is caffeic acid or derivatives thereof. The plant-derived polyvalent alcohol compounds is quinic acid or derivatives thereof.

The plant-derived polyvalent alcohol compounds is gallic acid or derivatives thereof. The plant-derived polyvalent alcohol compounds is ellagic acid or derivatives thereof.

The above-described rolling bearing is a rolling bearing for supporting a rotor of a motor. In the rolling bearing for the motor, the member on which the film-forming treatment is conducted is at least one of the inner ring and the outer ring.

The above-described rolling bearing rotatably supports a rotating shaft driven by an engine output on a stationary member of electric parts and auxiliary machines of a car. The above-described rolling bearing for the electric parts and auxiliary machines of the car, the member on which the film-forming treatment is conducted is at least one of the inner ring and the outer ring.

Effect of the Invention

In the rolling bearing of the present invention, the film-coating treatment is conducted on the sliding surface or the rolling surface of at least one of the metal-made bearing members constructing the rolling bearing with the plant-derived polyvalent alcohol compounds. Therefore the rolling bearing is excellent in its high-temperature and high-speed durability and is capable of preventing seizing in the high-temperature and high-speed operation. Further because the film-coating treatment is conducted with the plant-derived polyvalent alcohol compounds, the rolling bearing has a low environmental load.

Because in the rolling bearing for a motor and car electric parts and auxiliary machines, the film-coating treatment is conducted on the sliding surface or the rolling surface of at least one of the metal-made bearing members constructing the rolling bearing with the plant-derived polyvalent alcohol compounds, it is possible to effectively prevent the rolling bearing from having the peculiar peeling phenomenon which occurs with the rolling surface turning into white in its texture. Thus the rolling bearing is excellent in its lifetime and quietness.

Therefore the rolling bearing can be preferably utilized for motors of industrial machines, car equipment, home electric appliances. The rolling bearing can be also preferably used for car electric parts and auxiliary machines such as an alternator, an electromagnetic clutch for a car air conditioner, a fan coupling apparatus, an intermediate pulley, an electromotive fan motor.

DETAILED DESCRIPTION OF THE INVENTION

As a result of a high-temperature durability test conducted by using a rolling bearing in which the surfaces of bearing members were treated with a plant-derived polyvalent alcohol compounds, it has been found that the life of the rolling bearing can be prolonged. It is conceivable that owing to the action of the plant-derived polyvalent alcohol compounds, an iron oxide film is formed on the surfaces of the metal-made bearing members and inactivates surfaces of the bearing members. Thereby it is possible to restrain oxidative deterioration of grease or lubricating oil packed inside the bearing. As a result of conducting a sudden acceleration/deceleration test, it has been also found that the life of the bearing can be prolonged. It is conceivable that the iron oxide film formed on the surfaces of the bearing members restrains the generation of hydrogen caused by the decomposition of the grease composition. Thereby it is possible to prevent hydrogen brittleness-caused peculiar peeling from occurring on the rolling surface of the rolling bearing. The present invention is based on these findings.

Figure 1:
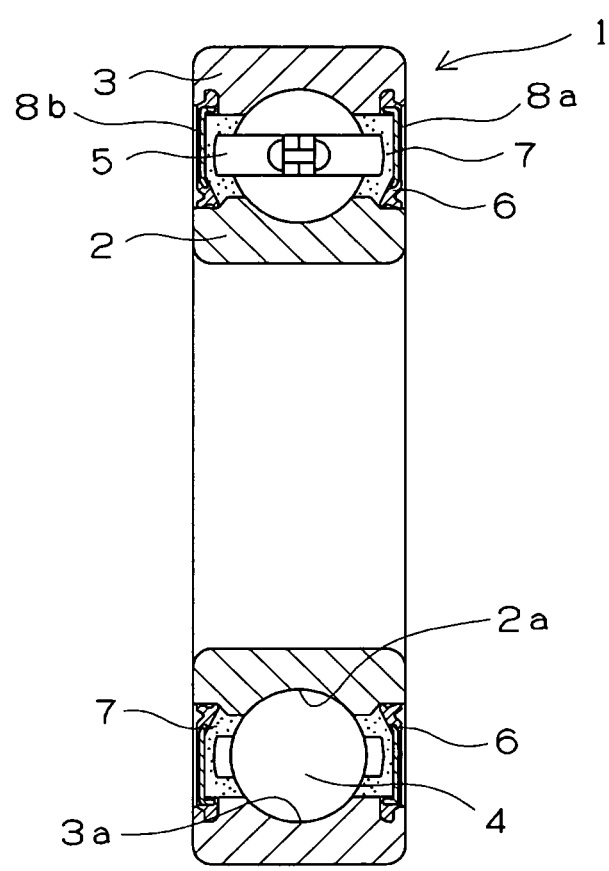
FIG. 1 is a sectional view of a deep groove ball bearing which is an example of the rolling bearing of the present invention.

The rolling bearing of the present invention is described below with reference to the drawings. FIG. 1 is a sectional view of a deep groove ball bearing which is an example of the rolling bearing of the present invention. As shown in FIG. 1, a rolling bearing (deep groove ball bearing) 1 is constructed of an inner ring 2 having a rolling surface 2a on its peripheral surface, an outer ring 3 having a rolling surface 3a on its inner peripheral surface, a plurality of rolling elements 4 disposed between the rolling surfaces 2a and 3a, and a cage 5 retaining the rolling elements 4. A sealing member 6 fixed to the outer ring 3 is provided at openings 8a and 8b disposed at both axial ends of the inner ring 2 and the outer ring 3. The inner ring 2, the outer ring 3, the rolling elements 4 or the cage 5 is a metal-made bearing member. Film-coating treatment is conducted on a sliding surface or a rolling surface of at least one of these metal-made bearing members with the plant-derived polyvalent alcohol compounds to be described later.

The details of the constituent members of the rolling bearing of the present invention are described below with reference to FIG. 1. The bearing members such as the inner ring 2, the outer ring 3, the rolling elements 4, and the cage 5 are made of known metal materials for the bearing. In the present invention, it is necessary to compose at least one of the metal-made bearing members of metal materials which can be subjected to film-forming treatment with the plant-derived polyvalent alcohol compounds. As examples, as materials for a bearing ring, bearing steel (high-carbon chromium bearing steel JIS G4805), case-hardening steel (JIS G4104 and the like), high-speed steel (AMS 6490), stainless steel (JIS G4303), and high-frequency hardening steel (JIS G4051 and the like) are listed. As materials for the cage, a cold-rolled steel plate for a cage to be produced by pressing (JIS G3141 and the like), carbon steel for a cage to be produced by machining (JIS G4051 and the like), high-strength brass casting for a cage to be produced by machining (JIS H5102 and the like) are listed. Other bearing alloys can be also adopted.

The sealing member 6 may consist of a metal or a rubber molding. Alternatively the sealing member 6 may consist of a complex of the rubber molding and a metal plate, a plastic plate or a ceramic plate. In consideration of durability and fixability, the complex of the rubber molding and the metal plate is preferable.

A lubricant such as a lubricating oil or grease is applied to or filled in the rolling bearing of the present invention. The type of the bearing is not limited to a specific one. The type of the bearing may be, for example, a radial ball bearing, a thrust ball bearing or the like. The lubricant is not limited to a specific one either, but any kind of lubricant can be used, provided that it is normally used for the bearing. In the deep groove ball bearing 1 shown in FIG. 1, grease 7 is packed on the peripheries of the rolling elements 4.

The method of conducting the film-forming treatment on the sliding surface or rolling surface of the metal-made bearing member is not limited to a specific method, but any method can be adopted, provided that the iron oxide film is formed on the sliding surface or rolling surface thereof owing to the action of the plant-derived polyvalent alcohol compounds. As a film-forming method, it is possible to adopt a method of immersing the metal-made bearing member on which a film is to be formed in a treatment liquid in which the plant-derived polyvalent alcohol compounds are dispersed or dissolved in water and/or an organic solvent to form the iron oxide film on the surface of the metal-made bearing member. To increase a film-forming process, it is preferable to carry out this method while the treatment liquid is being heated.

It is also possible to form the iron oxide film on the sliding surface or the like of the metal-made bearing member on which a film is to be formed by applying the treatment liquid in which the plant-derived polyvalent alcohol compounds are dispersed or dissolved in the water and/or the organic solvent.

The polyvalent alcohol compounds to be used in the present invention derives from plant, as described later. By conducting the film-forming treatment on the bearing member by using the polyvalent alcohol compounds, the rolling bearing of the present invention has improved high-temperature and high-speed durability owing to the formation of the iron oxide film, and in addition has a low environmental load. Further the rolling bearing can be effectively prevented from the occurrence of the hydrogen brittleness-caused peeling on the rolling surface thereof, and further is excellent in quietness.

As the plant-derived polyvalent alcohol compounds which can be used in the present invention, gallic acid, ellagic acid, chlorogenic acid, caffeic acid, quinic acid, curcumin, quercetin, pyrogallol, theaflavin, anthocyanin, rutin, lignan, and catechin are listed. It is also possible to use the polyvalent alcohol compounds obtained from sesamin, isoflavone, and coumarin which derive from plants. The above-described polyvalent alcohol compounds may be used singly or in combination of not less than two kinds thereof.

Of these polyvalent alcohol compounds, it is preferable to use the gallic acid or derivatives thereof, the ellagic acid or derivatives thereof, the chlorogenic acid or derivatives thereof, the caffeic acid or derivatives thereof, the quinic acid or derivatives thereof, the curcumin or derivatives thereof, the quercetin or derivatives thereof, because these compounds allow the iron oxide film to be easily formed on the surface of the metal-made bearing member in conducting the film-forming treatment. Especially, the curcumin, the quercetin, and the chlorogenic acid allow the bearing to have excellent high-temperature durability after the film-forming treatment is conducted.

The gallic acid to be used in the present invention is the polyvalent alcohol compound contained in a gallnut, tea leaves, and the like and has the structure shown in the following formula (1). The ellagic acid to be used in the present invention is the polyvalent alcohol compound contained in red raspberry and the like and has the structure shown in the following formula (2).

[Chemical formula 1]

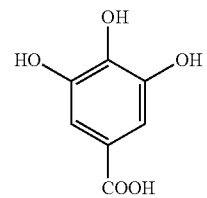

(1)

[Chemical formula 2]

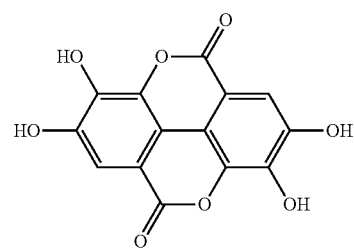

(2)

As the derivatives of the gallic acid to be used in the present invention, gallic acid esters such as methyl gallate, ethyl gallate, propyl gallate, butyl gallate, pentyl gallate, hexyl gallate, heptyl gallate, and octyl gallate and gallates such as bismuth gallate are listed. It is also possible to use the derivatives of the ellagic acid.

The chlorogenic acid to be used in the present invention is the polyvalent alcohol compound contained in coffee bean and the like and has the structure shown in the following formula (3).

[Chemical formula 3]

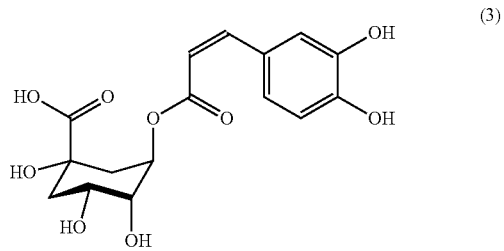

(3)

The caffeic acid and the quinic acid to be used in the present invention are polyvalent alcohol compounds to be obtained by hydrolysis of the chlorogenic acid. The caffeic acid and the quinic acid have the structure shown in the following formulas (4) and (5) respectively.

[Chemical formula 4]

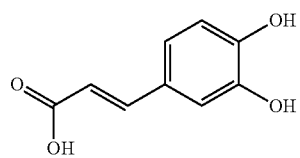

(4)

[Chemical formula 5]

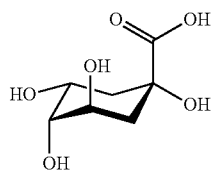
(5)

The curcumin to be used in the present invention is the polyvalent alcohol compound contained in turmeric and the like and has the structure shown in the following formula (6).

[Chemical formula 6]

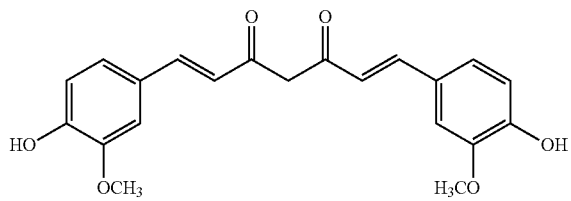
(6)

The quercetin to be used in the present invention is the polyvalent alcohol compound contained in citrus and the like and has the structure shown in the following formula (7).

[Chemical formula 7]

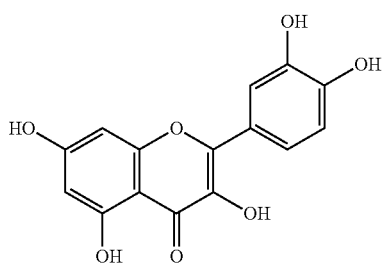
(7)

Figure 2:
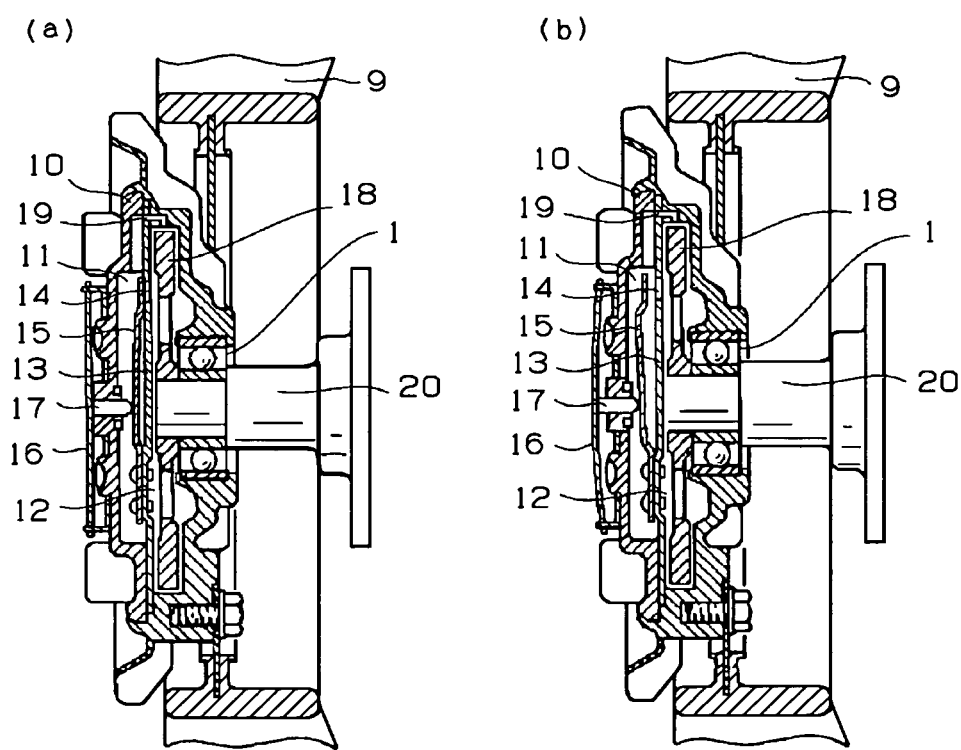
FIG. 2 is a sectional view showing a fan coupling apparatus in which the rolling bearing of the present invention is used.

As other example of the rolling bearing of the present invention, a rolling bearing for a fan coupling apparatus is described below with reference to FIGS. 2(a) and 2(b). FIGS. 2(a) and 2(b) are sectional views of the construction of the fan coupling apparatus. In the fan coupling apparatus, inside a casing 10 supporting a cooling fan 9 of the fan-coupling apparatus, there are provided an oil chamber 11 in which a viscous fluid such as silicone oil is filled and a stirring chamber 12 in which a drive disk 18 is incorporated. A port 14 is formed on a partitioning plate 13 interposed between both chambers 11 and 12. An end of a spring 15 for opening and closing the port 14 is fixed to the partitioning plate 13. A bimetal 16 is mounted on a front surface of the casing 10. A piston 17 of the spring 15 is provided on the bimetal 16. When the temperature of air that has passed through a radiator is not more than a set temperature, for example, 60° C., the bimetal 16 becomes flat. As a result, the piston 17 presses the spring 15, and the spring 15 closes the port 14. When the temperature of the air exceeds the set temperature, the bimetal 16 curves outward, as shown in FIG. 2(b). As a result, the spring 15 is released from being pressed by the piston 17. Thus the spring 15 deforms elastically and opens the port 14.

Supposing that the temperature of the air that has passed through the radiator is lower than the set temperature of the bimetal 16 when the fan-coupling apparatus having the above-described construction is operated, as shown in FIG. 2(a), the viscous fluid inside the oil chamber 11 does not flow into the stirring chamber 12 because the port 14 is closed with the spring 15. At this time, the viscous fluid inside the stirring chamber 12 is fed from a circulation hole 19 formed on the partitioning plate 13 into the oil chamber 11 owing to the rotation of the drive disk 18. Therefore the amount of the viscous fluid inside the stirring chamber 12 becomes slight. Because a shear resistance of the viscous fluid generated owing to the rotation of the drive disk 18 becomes small, a decreased torque is transmitted to the case 10. Thus the cooling fan 9 supported by the rolling bearing 1 rotates at a low speed. When the temperature of the air that has passed through the radiator exceeds the set temperature of the bimetal 16, as shown in FIG. 2(b), the bimetal 16 curves outward, and the spring 15 is released from being pressed by the piston 17. At this time, the spring 15 deforms elastically in a direction in which the spring 15 moves away from the partitioning plate 13. Thus the port 14 is opened. Thereby the viscous fluid inside the oil chamber 11 flows into the stirring chamber 12 from the port 14. Therefore the shear resistance of the viscous fluid generated owing to the rotation of the drive disk 18 becomes large. Thus an increased rotational torque is transmitted to the case 10, and the cooling fan 9 supported by the rolling bearing 1 rotates at a high speed.

As described above, because in the fan-coupling apparatus, the rotational speed of the cooling fan 9 changes in dependence on the change of temperature, warming-up is made fast, and over-cooling of cooling water is prevented. Thereby the engine can be effectively cooled. When the temperature of the engine is low, the cooling fan 9 is placed in a state in which the cooling fan 9 is disconnected from a driving shaft 20. On the other hand, when the temperature of the engine is high, the cooling fan 9 is placed in a state in which the cooling fan 9 is connected to the driving shaft 20. As such, the rolling bearing 1 is used in a wide range from a low temperature to a high temperature and in a sudden acceleration/deceleration condition in which the number of rotations changes greatly with a fluctuation of temperature. The inner ring, the outer ring, the rolling elements or the cage constructing the rolling bearing 1 is the metal-made bearing member. Film-coating treatment is conducted on the sliding surface or the rolling surface of at least one member selected from among these metal-made bearing members with the plant-derived polyvalent alcohol compounds. Grease is packed on the peripheries of the rolling elements.

Figure 3:
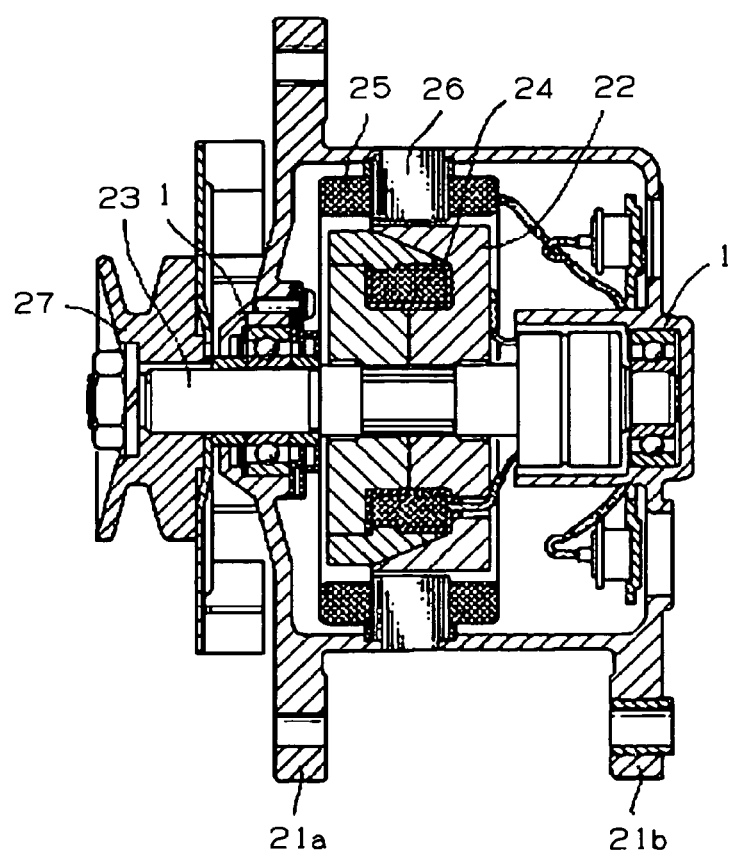
FIG. 3 is a sectional view showing an example of an alternator in which the rolling bearing of the present invention is used.

As other example of the rolling bearing of the present invention, a rolling bearing for an alternator is described below with reference to FIG. 3. FIG. 3 is a sectional view of the construction of the alternator. In the alternator, through a pair of rolling bearings 1, a rotor-rotating shaft 23 on which a rotor 22 is mounted is rotatably supported by a pair of stationary frames 21a and 21b which form a housing. A rotor coil 24 is mounted on the rotor 22. A three-winding stator coil 26 is mounted at a phase of 120 degrees on a stator 25 disposed on the periphery of the rotor 22. A rotor-rotating shaft 23 of the rotor 22 is driven by a rotational torque transmitted to a pulley 27 mounted on the front end thereof through a belt (not shown in FIG. 3). The pulley 27 is mounted on the rotor-rotating shaft 23 in a cantilevered state. Vibrations are generated when the rotor-rotating shaft 23 rotates at a high speed. Thus a rolling bearing 1 supporting the pulley 27 is subjected to a very high load. The inner ring, the outer ring, the rolling elements or the cage constructing the rolling bearing 1 is the metal-made bearing member. Film-coating treatment is conducted on the sliding surface or the rolling surface of at least one member selected from among these metal-made bearing members with the plant-derived polyvalent alcohol compounds. Grease is packed on the peripheries of the rolling elements.

Figure 4:
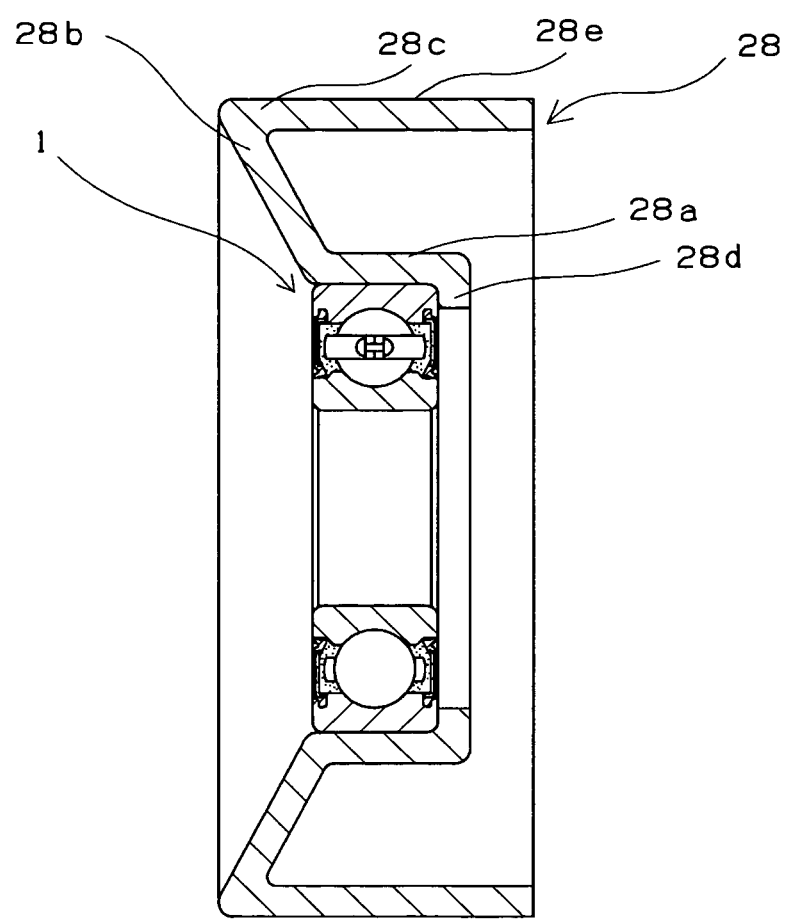
FIG. 4 is a sectional view showing an example of an idler pulley in which the rolling bearing of the present invention is used.

As other example of the rolling bearing of the present invention, a rolling bearing for an idler pulley to be used as a belt tensioner of an auxiliary machine-driving belt of a car is described below with reference to FIG. 4. FIG. 4 is a sectional view showing the construction of the idler pulley. The pulley is constructed of a pulley body 28 made of a steel press plate and a single-row deep groove rolling bearing 1 fitted on the inside diameter of the pulley body 28. The pulley body 28 is an annular body constructed of an inside-diameter cylindrical part 28a, a flange part 28b extending from one end of the inside-diameter cylindrical part 28a to the outside diameter side of the pulley body 28, an outside-diameter cylindrical part 28c extending axially from the flange part 28b, and a collar 28d extending from the other end of the inside-diameter cylindrical part 28a to the inner-diameter side of the body 28. An outer ring 3 of the rolling bearing 1 shown in FIG. 1 is fitted on the inside diameter of the inside-diameter cylindrical part 28a. A pulley peripheral surface 28e that contacts a belt driven by the engine is provided on the outside diameter of the outside-diameter cylindrical part 28c. The pulley peripheral surface 28e is brought into contact with the belt to allow the pulley to serve as an idler. The inner ring, the outer ring, the rolling elements or the cage constructing the rolling bearing 1 is the metal-made bearing member. Film-coating treatment is conducted on the sliding surface or the rolling surface of at least one member selected from among these metal-made bearing members with the plant-derived polyvalent alcohol compounds. Grease is packed on the peripheries of the rolling elements.

Figure 5:
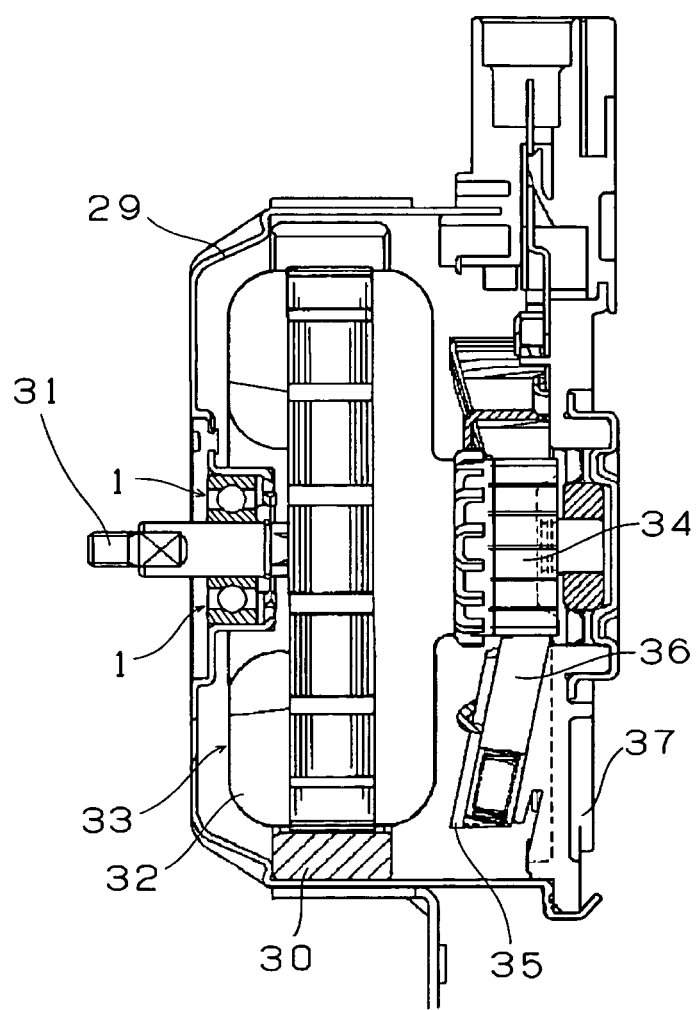
FIG. 5 is a sectional view showing an example of a motor in which the rolling bearing of the present invention is used.

As other example of the rolling bearing of the present invention, a rolling bearing for a motor is described below with reference to FIG. 5. FIG. 5 is a sectional view of the motor. The motor has a stator 30 consisting of a magnet, for the motor, which is disposed on an inner peripheral wall of a jacket 29, a rotor 33 on which a winding 32 fixed to a rotating shaft 31 is wound, a commutator 34 fixed to the rotating shaft 31, a brush holder 35 disposed on an end frame 37 supported by the jacket 29, and a brush 36 accommodated inside the brush holder 35. The rotating shaft 31 is rotatably supported on the jacket 29 by a rolling bearing 1 and a supporting construction for the rolling bearing 1. The inner ring, the outer ring, the rolling elements or the cage constructing the rolling bearing 1 is the metal-made bearing member. Film-coating treatment is conducted on the sliding surface or the rolling surface of at least one member selected from among these metal-made bearing members with the plant-derived polyvalent alcohol compounds. Grease is packed on the peripheries of the rolling elements.

As motors to which the rolling bearing of the present invention is applicable, it is possible to list motors for industrial machines such as a ventilation fan motor, a blower motor for a fuel battery, a cleaner motor, a fan motor, a servo motor, a stepping motor; motors for electric equipment such as a starter motor of a car, an electromotive power steering motor, a steering-adjusting tilt motor, a wiper motor, and a power window motor; and motors for home electric appliances.

EXAMPLES

The polyvalent alcohol compounds used in the examples shown below were all reagents produced by Tokyo Chemical Industry Co., Ltd.

Examples 1 through 7

0.5 g of the polyvalent alcohol compound shown in table 1 was added to 99.5 g of a solvent shown in table 1 to prepare a treatment liquid. A bearing 6204 (dimension of bearing: inner diameter: 20 mm, outer diameter: 47 mm, and width: 14 mm, and material: SUJ2) of each example was rotated for four hours with the bearing being immersed in the treatment liquid to form an iron oxide film on the entire surfaces of metal-made bearing members of the rolling bearing. 0.7 g of grease (Multemp DRL produced by KYODO YUSHI CO., LTD.) was packed inside the bearing to obtain a rolling bearing specimen. A high-temperature durability test shown below was conducted on each of the obtained rolling bearing specimens to measure the lifetime thereof. Table 1 shows the results.

<High-Temperature Durability Test 1>

Each rolling bearing specimen was rotated at 10000 rpm in a condition in which the temperature of the outside-diameter portion of the outer ring thereof was set to 150° C., a radial load was set to 67N, and an axial load was set to 67N. The period of time (hour) until before seizing occurred was measured as the lifetime of each rolling bearing specimen.

Examples 8 through 10

0.5 g of the polyvalent alcohol compound shown in table 1 was added to 99.5 g of a solvent shown in table 1 to prepare a treatment liquid of each example. A cage (material: SPCC) of the bearing 6204 (dimension of bearing: inner diameter: 20 mm, outer diameter: 47 mm, and width: 14 mm) of each example was immersed in the treatment liquid for four hours to form an iron oxide film on the surface of each cage. 0.7 g of grease (Multemp DRL produced by KYODO YUSHI CO., LTD.) was packed inside each bearing produced by using the cage. In this manner, a rolling bearing specimen of each example was obtained. The above-described high-temperature durability test was conducted on each of the obtained rolling bearing specimens to measure the lifetime thereof. Table 1 shows the results.

Comparative Example 1

Without conducting surface treatment on a metal-made bearing member, 0.7 g of grease (Multemp DRL produced by KYODO YUSHI CO., LTD.) was packed inside the bearing 6204 (dimension of bearing: inner diameter: 20 mm, outer diameter: 47 mm, and width: 14 mm) to obtain a rolling bearing specimen. The above-described high-temperature durability test was conducted on the obtained rolling bearing specimen to measure the lifetime thereof. Table 1 shows the results.

TABLE 1

| | Example | | | | | | |
|---|---|---|---|---|---|---|---|
| | 1 | 2 | 3 | 4 | 5 | 6 | 7 |
| Surface-treated portion | Entire bearing | Entire bearing | Entire bearing | Entire bearing | Entire bearing | Entire bearing | Entire bearing |
| Polyvalent alcohol compound | Curcumin | Quercetin | Chlorogenic acid | Caffeic acid | Gallic acid | Quinic acid | Ellagic acid |
| Solvent | acetone | acetone | water | acetone | water | water | water |
| High-temperature and high-speed life of bearing, h | 700 | 500 | 350 | 250 | 150 | 150 | 120 |

| | Example | | | Comparative example |
|---|---|---|---|---|
| | 8 | 9 | 10 | 1 |
| Surface-treated portion | Cage | Cage | Cage | — |
| Polyvalent alcohol compound | Chlorogenic acid | Quercetin | Curcumin | — |
| Solvent | water | acetone | acetone | — |
| High-temperature and high-speed life of bearing, h | 350 | 250 | 150 | 100 |

As shown in table 1, the rolling bearing specimens of all of the examples 1 through 10 showed excellent high-temperature durability in that the lives thereof were not less than 120 hours in the high-temperature durability test. It is conceivable that the iron oxide films formed owing to the action of the polyvalent alcohol compounds suppressed oxidative deterioration of the grease. On the other hand, the rolling bearing specimen of the comparative example 1 had a shorter life than the rolling bearing specimens of the examples 1 through 10.

Example 11

Figure 6:
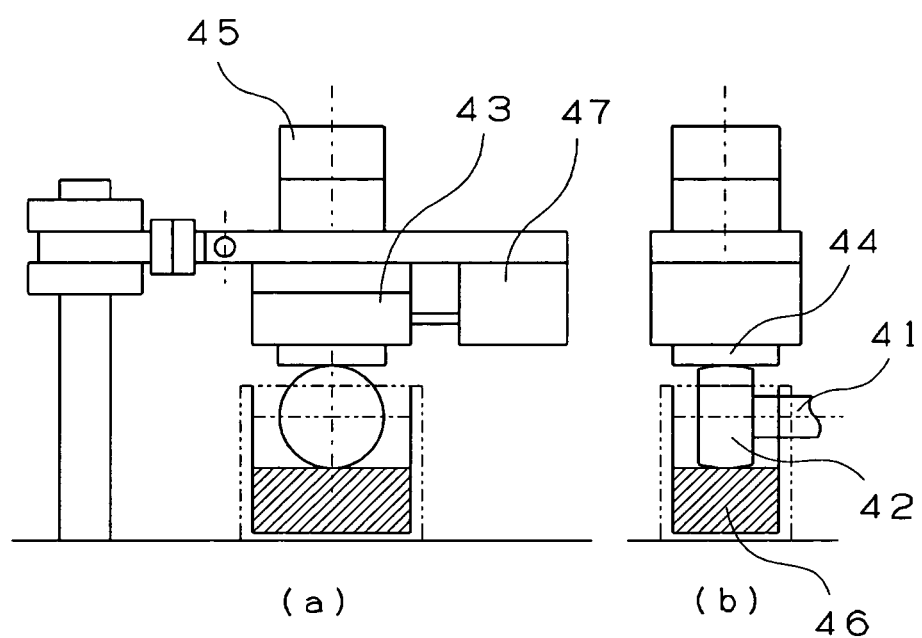
FIG. 6 shows a sliding testing machine.
Figure 7:
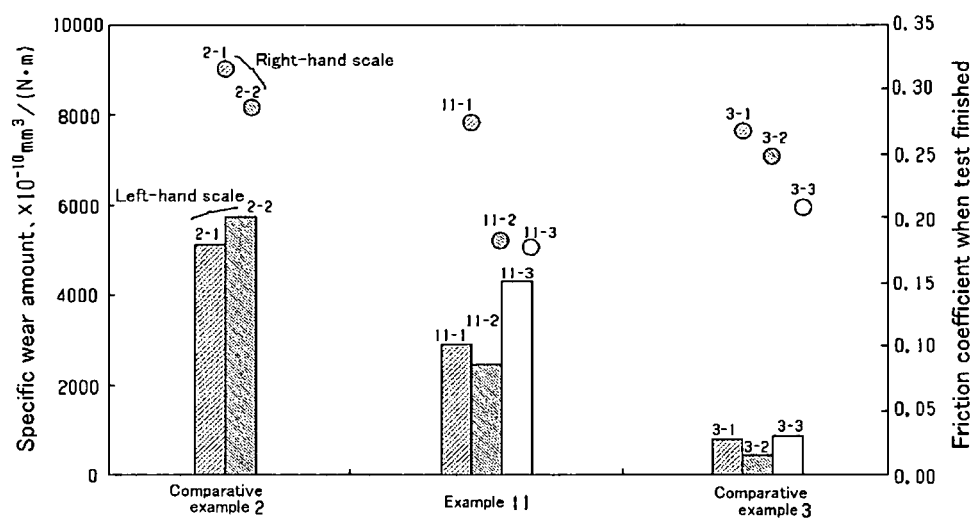
FIG. 7 shows results of measurement of specific wear amounts and friction coefficients.

A ring-shaped base material SUJ2 having a dimension of outer diameter 40 mm×inner diameter 20 mm×t10 (secondary curvature R: 60 mm) was rotated for four hours with the ring-shaped base material being immersed in the treatment liquid (contained chlorogenic acid) of the example 3 to form an iron oxide film on the base material. In this manner, a ring-shaped specimen was obtained. The obtained ring-shaped specimen was subjected to a sliding test shown below to measure its specific wear amount and friction coefficient when the test finished three times respectively. The results are shown in table 2 and FIG. 7. Each of the specific wear amounts shown in table 2 is an average value of the specific wear amounts measured three times. The bar graphs of FIG. 7 show individual data obtained by measuring the specific wear amount three times. Each of the circles of FIG. 7 shows the friction coefficient each time measurement finished.
<Sliding Test>
A sliding testing machine shown in FIG. 6 was used. FIG. 6(a) and FIG. 6(b) show a front view and a side view respectively. A ring-shaped specimen 42 was mounted on a rotating shaft 41, and a steel plate 44 is fixed to an air slider 43 of an arm portion. While a predetermined load 45 is being applied to the ring-shaped specimen 42 from an upper portion in FIG. 6, the ring-shaped specimen 42 contacts the steel plate 44 with the ring-shaped specimen 42 rotating, and lubricating oil is supplied to an outside-diameter surface of the ring-shaped specimen 42 from a felt pad 46 impregnated with the lubricating oil. A frictional force generated when the ring-shaped specimen 42 is rotated is detected by a load cell 47. As the steel plate 44, an SCM415 carburized steel quenched and tempered (Hv 700) was used. As the lubricating oil, Mobil Velocity Oil No. 3 (produced by Exxon Mobil Corporation: VG2) was used. The load was 75N. The sliding speed was 0.05 m/second. The test period of time was one minute.

Comparative Example 2

By using BK-3901 produced by Nihon Parkerizing Co., Ltd., black oxide finish was conducted on the ring-shaped base material SUJ2 having a dimension equal to that of the ring-shaped base material used in the example 11 to obtain a ring-shaped specimen. The obtained ring-shaped specimen was subjected to the above-described sliding test to measure its specific wear amount and friction coefficient when the test finished two times respectively. The results are shown in table 2 and FIG. 7. Each of the specific wear amounts shown in table 2 is an average value of the specific wear amounts measured two times. The bar graphs of FIG. 7 show individual data obtained by measuring the specific wear amount two times. Each of the circles of FIG. 7 shows the friction coefficient each time measurement finished.

Comparative Example 3

Without conducting surface treatment on the ring-shaped base material SUJ2 having a dimension equal to that of the ring-shaped base material of the example 11, the ring-shaped base material SUJ2 was subjected to the above-described sliding test as the ring-shaped specimen to measure its specific wear amount and friction coefficient when the test finished three times respectively. The results are shown in table 2 and FIG. 7. Each of the specific wear amounts shown in table 2 is an average value of the specific wear amounts measured three times. The bar graphs of FIG. 7 show individual data obtained by measuring the specific wear amount three times. Each of the circles of FIG. 7 shows the friction coefficient each time measurement finished.

TABLE 2

| | Example | Comparative example | |
|---|---|---|---|
| | 11 | 2 | 3 |
| Material of cage | SUJ2 | SUJ2 | SUJ2 |
| Surface-treating method | Treatment with chlorogenic acid | Black oxide finish | — |

TABLE 2-continued

|  | Example | Comparative example | |
|---|---|---|---|
|  | 11 | 2 | 3 |
| Specific wear amount ($\times 10^{-10}$ mm³/(N·m)) | 3000 | 5000 | 500 |

As shown in table 2 and FIG. 7, the ring-shaped specimen of the example 11 having the iron oxide film formed by using the particular polyvalent alcohol compound showed a smaller friction coefficient and specific wear amount than the ring-shaped specimen of the comparative example 2 which underwent black oxide finish treatment and is thus excellent in its sliding property.

Examples 12 through 18

0.5 g of the polyvalent alcohol compound shown in table 3 was added to 99.5 g of the solvent shown in table 1 to prepare a treatment liquid of each example. A bearing 6203 (dimension of bearing: inner diameter: 17 mm, outer diameter: 40 mm, and width: 12 mm, and material: SUJ2) of each example was rotated for four hours with the bearing being immersed in the treatment liquid to form an iron oxide film on the entire surfaces of metal-made bearing members of each rolling bearing. Grease (E5 grease produced by NTN Corporation) was packed inside the bearing to obtain a rolling bearing specimen. A sudden acceleration/deceleration test shown below was conducted on each of the obtained rolling bearing specimens to measure the lifetime thereof until before peeling occurred. Table 3 shows the results.

<Sudden Acceleration/Deceleration Test>

A sudden acceleration/deceleration test was conducted by mounting each of the above-described rolling bearing specimens on a testing machine as a rolling bearing supporting a rotating shaft by an inner ring. The rotating shaft supported a pulley of an alternator which is an example of electric parts and auxiliary machines. A rotating belt was wound on the pulley. The sudden acceleration/deceleration test was conducted in conditions where a load of 1960N was applied to the pulley mounted on the tip of the rotating shaft, a rotating speed was set to 0 to 18000 rpm as the operation condition, and electric current of 0.1 A flowed through the test bearing. The testing machine stopped when the vibration of a vibration detector exceeded a predetermined value because peculiar peeling occurred inside the test bearing. The period of time (hour) elapsed until before the testing machine stopped was measured as the lifetime thereof until before peeling occurred.

Comparative Example 4

Without conducting surface treatment on the metal-made bearing member, grease identical to that of the example 12 was packed inside the bearing 6203 (dimension of bearing: inner diameter: 17 mm, outer diameter: 40 mm, and width: 12 mm) to obtain a rolling bearing specimen. The above-described sudden acceleration/deceleration test was conducted on the obtained rolling bearing specimen to measure the lifetime thereof until before peeling occurred. Table 3 shows the results.

TABLE 3

|  | Example | | | | | | | Comparative example |
|---|---|---|---|---|---|---|---|---|
|  | 12 | 13 | 14 | 15 | 16 | 17 | 18 | 4 |
| Surface-treated portion | Entire bearing | Entire bearing | Entire bearing | Entire bearing | Entire bearing | Entire bearing | Entire bearing | — |
| Surface-treateing agent | Curcumin | Quercetin | Chlorogenic acid | Caffeic acid | Gallic acid | Quinic acid | Ellagic acid | — |
| Solvent | acetone | acetone | water | acetone | water | water | water | — |
| Lifetime until before occurrence of peeling, h | 510 | 600 | 630 | 590 | 480 | 620 | 550 | 400 |

As shown in table 3, the rolling bearing specimens of all of the examples 12 through 18 showed excellent durability in that the lives thereof were not less than 480 hours in the sudden acceleration/deceleration test. It is conceivable that the iron oxide films formed owing to the action of the polyvalent alcohol compounds restrained the generation of hydrogen caused by the decomposition of the grease and was capable of preventing hydrogen brittleness-caused peculiar peeling from occurring on the rolling surface of each bearing. On the other hand, the rolling bearing specimen of the comparative example 4 had a shorter life than the rolling bearing specimens of the examples 12 through 18.

Examples 19 through 25

0.5 g of the polyvalent alcohol compound shown in table 4 was added to 99.5 g of the solvent shown in table 1 to prepare a treatment liquid of each example. The bearing 6203 (dimension of bearing: inner diameter: 17 mm, outer diameter: 40 mm, and width: 12 mm, and material: SUJ2) of each example was rotated for four hours with the bearing being immersed in the treatment liquid to form an iron oxide film on the entire surfaces of metal-made bearing members of the rolling bearing. Grease (E5 grease produced by NTN Corporation) was packed inside each bearing to obtain a rolling bearing specimen of each example. A sudden acceleration/deceleration test shown below was conducted on each of the obtained rolling bearing specimens to measure the lifetime thereof until before peeling occurred and quietness thereof. Table 4 shows the results.

<Sudden Acceleration/Deceleration Test>

Simulating an alternator which is an example of a motor, a sudden acceleration/deceleration test was conducted by mounting each rolling bearing specimen on a testing machine as a rolling bearing which supports a rotating shaft by an inner ring thereof. The sudden acceleration/deceleration test was conducted in conditions where a load of 1960N was applied to a pulley mounted on the tip of the rotating shaft, a rotating speed was set to 0 to 18000 rpm as an operation condition, and electric current of 0.1 A flowed through the test bearing. The testing machine stopped when the vibration of a vibration detector exceeded a predetermined value because peculiar peeling occurred inside the bearing. The period of time (hour) elapsed until before the testing machine stopped was measured as the lifetime thereof until before peeling occurred. The quietness immediately after the test started was judged aurally on the basis of the comparative example 5.

Comparative Example 5

Without conducting surface treatment on the metal-made bearing member, grease identical to that of the example 19 was packed inside the bearing 6203 (dimension of bearing: inner diameter: 17 mm, outer diameter: 40 mm, and width: 12 mm) to obtain a rolling bearing specimen. The above-described sudden acceleration/deceleration test was conducted on the obtained rolling bearing specimen to measure the lifetime thereof until before peeling occurred and quietness thereof. Table 4 shows the results.

Comparative Example 6

A rolling bearing specimen was obtained by conducting treatment similarly to the comparative example 5 except that grease which contained 1 wt % of a passivating agent (sodium nitrite) for the entire grease was used. The sudden acceleration/deceleration test was conducted on the obtained rolling bearing specimen to measure the lifetime thereof until before peeling occurred and quietness thereof. Table 4 shows the results.

TABLE 4

| | Example | | | | | | | Comparative example | |
|---|---|---|---|---|---|---|---|---|---|
| | 19 | 20 | 21 | 22 | 23 | 24 | 25 | 5 | 6 |
| Surface-treated portion | Entire bearing | Entire bearing | Entire bearing | Entire bearing | Entire bearing | Entire bearing | Entire bearing | — | — |
| Surface-treateing agent | Curcumin | Quercetin | Chlorogenic acid | Caffeic acid | Gallic acid | Quinic acid | Ellagic acid | — | — |
| Solvent | acetone | acetone | water | acetone | water | water | water | — | — |
| Lifetime until before occurrence of peeling, h | 510 | 600 | 630 | 590 | 480 | 620 | 550 | 400 | 520 |
| Quietness | ○ | ○ | ○ | ○ | ○ | ○ | ○ | ○ | x |

As shown in table 4, the rolling bearing specimens of all of the examples 19 through 25 showed excellent durability in that the lives thereof were not less than 480 hours in the sudden acceleration/deceleration test. It is conceivable that the iron oxide films formed owing to the action of the polyvalent alcohol compounds restrained the generation of hydrogen caused by the decomposition of the grease and was capable of preventing hydrogen brittleness-caused peculiar peeling from occurring on the rolling surface of each bearing. On the other hand, the rolling bearing specimen of the comparative example 5 had a shorter life than the rolling bearing specimens of the examples 19 through 25. Although the rolling bearing specimen of the comparative example 6 had a long life, it had a big vibration and was thus inferior in its quietness.

Because in the rolling bearing of the present invention, film-coating treatment is performed on the sliding surface or the rolling surface of the metal-made bearing members with the plant-derived polyvalent alcohol compounds, the rolling bearing has a long life in a sudden acceleration/deceleration condition and in a high-temperature and high-speed condition and has a low environmental load. Therefore the rolling bearing can be preferably utilized as rolling bearings for home electric appliances, electric parts and auxiliary machines of a car, industrial equipment, and the like used in a high-temperature and high-speed rotation condition. More specifically, the rolling bearing can be preferably utilized as rolling bearings for the electric parts and auxiliary machines of the car such as an alternator, an electromagnetic clutch for a car air conditioner, a fan coupling apparatus, an intermediate pulley, an electromotive fan motor; and as rolling bearings for motors for industrial machines, equipment of the car, home electric appliances, and the like.

EXPLANATION OF REFERENCE NUMERALS AND SYMBOLS

1: rolling bearing (deep groove ball bearing)
2: inner ring
3: outer ring
4: rolling element
5: cage
6: sealing member
7: grease
8a, 8b: opening portion
9: cooling fan
10: case
11: oil chamber
12: stirring chamber
13: partitioning plate
14: port
15: spring
16: bimetal
17: piston
18: drive disk
19: circulation hole
20: driving shaft
21a, 21b: frame
22: rotor
23: rotor-rotating shaft
24: rotor coil
25: stator
26: stator coil
27: pulley
28: pulley body
29: jacket
30: stator
31: rotating shaft
32: winding
33: rotor
34: commutator
35: brush holder
36: brush 37: end frame
41: rotating shaft
42: ring-shaped specimen
43: air slider
44: steel plate
45: load
46: felt pad
47: load cell

The invention claimed is:

1. A rolling bearing comprising metal-made bearing members including an inner ring, an outer ring, a plurality of rolling elements disposed between said inner ring and said outer ring, and a cage retaining said rolling elements,
wherein a film-coating treatment is conducted on a sliding surface or a rolling surface of at least one of said metal-made bearing members with at least one plant-derived polyvalent alcohol compound selected from the group consisting of curcumin, derivatives of curcumin, quercetin, derivatives of quercetin, chlorgenic acid, derivatives of chlorogenic acid, caffeic acid, derivatives of caffeic acid, gallic, derivatives of gallic acid, ellagic acid and derivatives of ellagic acid.

2. The rolling bearing according to claim 1, wherein said member on which said film-forming treatment is conducted is said cage.

3. The rolling bearing according to claim 1, wherein said member on which said film-forming treatment is conducted has an iron oxide film on a sliding surface or a rolling surface thereof.

4. The rolling bearing according to claim 1, wherein in said film-forming treatment, said metal-made bearing member on which said film-forming treatment is to be conducted is immersed in a treatment liquid in which said plant-derived polyvalent alcohol compounds are dispersed or dissolved in water and/or an organic solvent.

5. The rolling bearing, according to claim 1, which supports a rotor of a motor.

6. The rolling bearing according to claim 5, wherein said member on which said film-forming treatment is conducted is at least one of said inner ring and said outer ring.

7. The rolling bearing, according to claim 1, which rotatably supports a rotating shaft driven by an engine output on a stationary member of electric parts and auxiliary machines of a car.

8. The rolling bearing according to claim 7, wherein said member on which said film-forming treatment is conducted is at least one of said inner ring and said outer ring.

* * * * *